(12) United States Patent
Castaneda et al.

(10) Patent No.: US 11,624,388 B2
(45) Date of Patent: Apr. 11, 2023

(54) TURNBUCKLE LINK-GAGE

(71) Applicant: General Electric Company, Schenectady, NY (US)

(72) Inventors: Jaime Roberto Castaneda, Queretaro (MX); Manuel Jimenez, Queretaro (MX)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 17/020,264

(22) Filed: Sep. 14, 2020

(65) Prior Publication Data
US 2022/0082121 A1   Mar. 17, 2022

(51) Int. Cl.

| | |
|---|---|
| *F01D 17/16* | (2006.01) |
| *F16B 7/06* | (2006.01) |
| *F16C 7/06* | (2006.01) |
| *F02C 7/20* | (2006.01) |
| *F16B 7/18* | (2006.01) |
| *F16B 2/06* | (2006.01) |
| *F16B 39/36* | (2006.01) |

(52) U.S. Cl.
CPC ............. *F16B 7/06* (2013.01); *F01D 17/162* (2013.01); *F16C 7/06* (2013.01); *F02C 7/20* (2013.01); *F16B 2/065* (2013.01); *F16B 7/182* (2013.01); *F16B 39/36* (2013.01); *F16C 2360/23* (2013.01)

(58) Field of Classification Search
CPC .. F16B 7/06; F16B 2/065; F16B 7/182; F16B 39/36; F01D 17/162; F16C 7/06; F16C 2360/23; F02C 7/20; Y10T 403/29–299; Y10T 403/57–5793; Y10T 403/7047–7058

USPC .................................................. 285/342, 322
See application file for complete search history.

(56) References Cited

U.S. PATENT DOCUMENTS

| | | | |
|---|---|---|---|
| 598,307 A * | 2/1898 | Leffler | .................... B25C 5/085 403/44 |
| 1,672,488 A * | 6/1928 | Hall | ......................... G01B 5/08 33/816 |
| 2,533,894 A | 12/1950 | Podell | |
| 2,580,482 A | 1/1952 | Stukenborg et al. | |
| 2,678,226 A | 5/1954 | Wright | |
| 2,704,439 A * | 3/1955 | Cousins | .................... F02C 7/08 60/39.511 |
| 2,709,608 A | 5/1955 | Smith | |

(Continued)

*Primary Examiner* — Gerald L Sung
*Assistant Examiner* — Rene D Ford
(74) *Attorney, Agent, or Firm* — Hanley, Flight & Zimmerman, LLC

(57) ABSTRACT

Turnbuckle linkages are disclosed herein. A turnbuckle linkage includes an inside rod including a first opening on a first longitudinal end and a second opening on a second longitudinal end of the inside rod, the first opening and the second opening extending at least partially through the inside rod, the inside rod including tabs extending from the first longitudinal end and the second longitudinal end of the inside rod around the first opening and the second opening, an exterior surface of the tabs including conical threads, outside rods to be positioned within the openings of the inside rod, the tabs of the inside rod at least partially surrounding the outside rods, the outside rods including end bearings to couple to a first structure and a second structure, and conical nuts to constrict the tabs around the outside rods and couple the inside rod and the outside rods.

19 Claims, 8 Drawing Sheets

(56) References Cited

U.S. PATENT DOCUMENTS

| | | | | | |
|---|---|---|---|---|---|
| 3,278,210 | A | * | 10/1966 | Sanders | F16B 7/06 403/46 |
| 3,674,075 | A | | 7/1972 | Hoegee | |
| 3,721,134 | A | | 3/1973 | Lamke | |
| 4,431,092 | A | * | 2/1984 | Kloster | F16F 9/54 188/322.19 |
| 4,554,780 | A | * | 11/1985 | Umeno | A01D 34/69 56/11.8 |
| 4,645,473 | A | * | 2/1987 | Mochizuki | F16D 3/387 464/182 |
| 5,782,078 | A | * | 7/1998 | Brantley | F16B 7/06 60/797 |
| 9,261,132 | B2 | | 2/2016 | McNeil | |
| 9,695,854 | B2 | | 7/2017 | Gutta et al. | |
| 2010/0003074 | A1 | * | 1/2010 | Kim | E04C 5/165 403/334 |
| 2015/0030303 | A1 | * | 1/2015 | Kuffel | G02B 6/4471 385/136 |
| 2015/0050122 | A1 | * | 2/2015 | Gutta | F16B 7/06 415/12 |
| 2019/0352893 | A1 | * | 11/2019 | Wright | E03F 1/008 |

* cited by examiner

TURNBUCKLE LINK-GAGE

FIELD OF THE DISCLOSURE

This disclosure relates generally to a turnbuckle, and, more particularly, to a turnbuckle link-gage.

BACKGROUND

During operation of an axial flow turbomachine, air is continuously induced into a compressor. The compressor accelerates and increases the pressure of the air via rotating blades and adjacent rows of variable stator vanes that guide the air into a combustor. The efficiency of the compressor can be optimized by controlling vane angles of the variable stator vanes via turnbuckles. During installation and testing, lengths of the turnbuckles are adjusted to determine the vane angles that optimize the efficiency of the compressor. Once the optimal vane angles are determined, the lengths of the turnbuckles are fixed to maintain the optimal vane angles during operation. The vane angles are critical to the compressor pressure ratio and, thus, the efficiency of the axial flow turbomachine.

BRIEF DESCRIPTION

Turnbuckle apparatus, turnbuckle link-gage devices, and associated methods are disclosed.

Certain examples provide an example turnbuckle link-gage including an inside rod including a first opening on a first longitudinal end of the inside rod and a second opening on a second longitudinal end of the inside rod, the first and second opening extending at least partially through the inside rod, the inside rod including tabs extending from the first and second longitudinal ends of the inside rod at least partially around the first and second openings, an exterior surface of the tabs including conical threads, outside rods to be at least partially positioned within the openings of the inside rod, the tabs of the inside rod at least partially surrounding the outside rods, the outside rods including end bearings to couple to a first structure and a second structure, and conical nuts including threads correlating with the conical threads of the tabs of the inside rod, the conical nuts to threadably couple to the tabs, the conical nuts to constrict the tabs around the outside rods and couple the inside rod and the outside rods.

Certain examples provide an example apparatus including a hollow rod with an internal circumference, the hollow rod including tabs extending from at least one longitudinal end of the hollow rod, an exterior surface of the tabs including conical threads, at least one threadless rod, at least a portion of the threadless rod to be positioned within the hollow rod, a circumference of the threadless rod to be approximately equivalent to the internal circumference of the hollow rod, and at least one nut including internal conical threads complementary to the conical threads of the exterior surface of the tabs of the hollow rod, an engagement between the internal conical threads of the nut and the conical threads of the exterior surface of the tabs of the hollow rod to substantially constrict the tabs of the hollow rod around the threadless rod to couple the hollow rod and the threadless rod.

Certain examples provide an example axial flow turbomachine including variable stator vanes to direct airflow through rotor blades of the axial flow turbomachine, and turnbuckle link-gages to couple a case of the variable stator vanes to a structure of the axial flow turbomachine. The turnbuckle link-gages include a hollow rod with at least one opening, the hollow rod including tabs extending from longitudinal ends around the opening, an exterior surface of the tabs including conical threads, a threadless rod, the threadless rod to be positioned at least partially within the opening of the hollow rod, and nuts including conical threads, the nuts to couple the hollow rod and the threadless rod by coupling to the tabs of the hollow rod and constricting the tabs of the hollow rod around the threadless rod.

Figure 1:
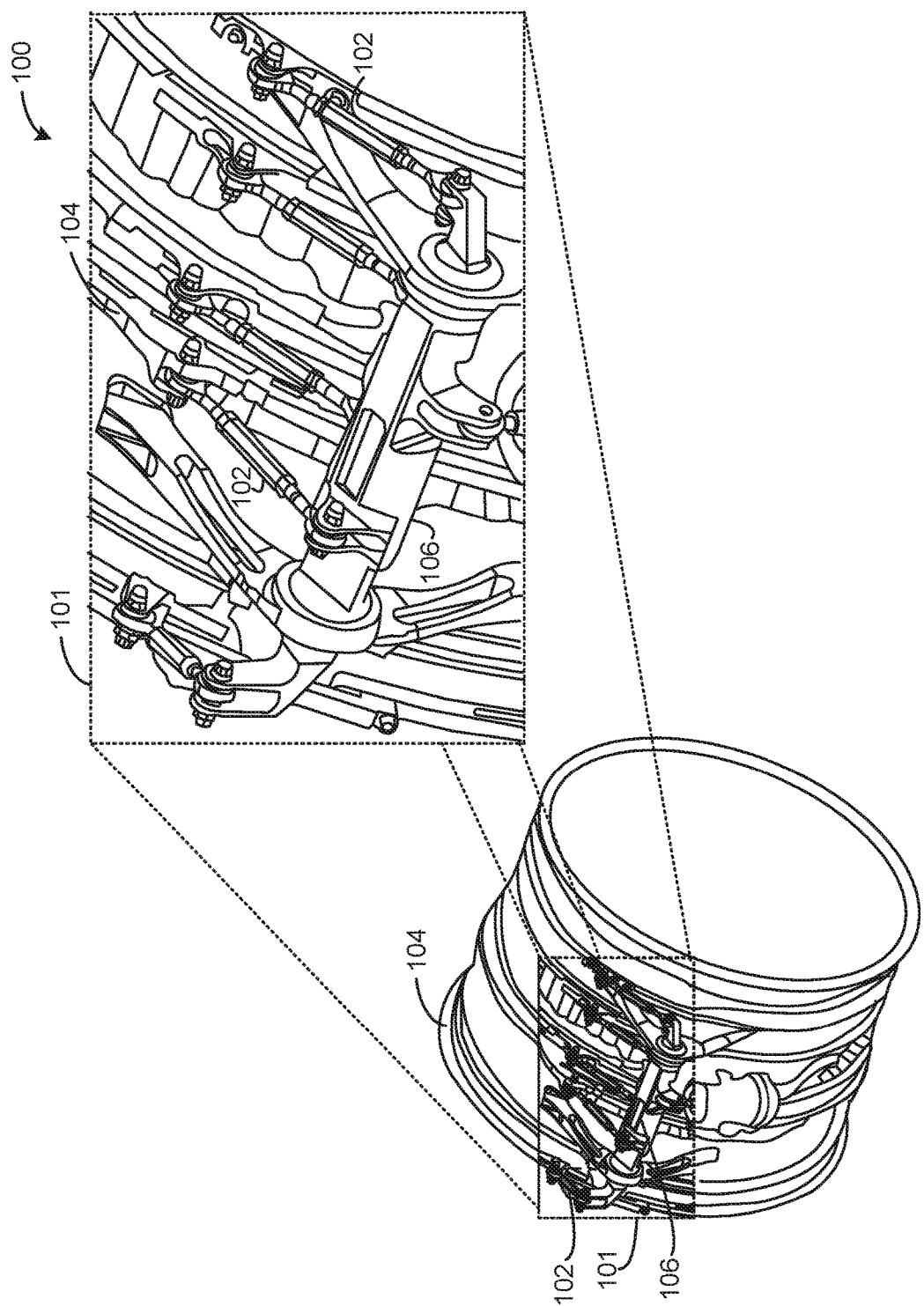
FIG. 1 illustrates an example axial flow turbomachine with example turnbuckle link-gages in accordance with the teachings herein.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing and/or assembly tolerances and/or other real world imperfections. As used herein, "substantially constrict" refers to a compression force that at least partially surrounds a perimeter of a structure(s) to tighten the perimeter of, or reduce a displacement between, the structure(s). As used herein "threadless" refers to a structure that does not include threads on a surface thereof.

DETAILED DESCRIPTION

A turnbuckle link-gage is disclosed herein. In general, turnbuckles can be used to provide a linkage with an adjustable length within an axial flow turbomachine, such as, but not limited to, an aircraft engine, a turbojet, a turbofan, a marine gas turbine, an oil & gas pipeline compressor, an industrial gas turbine, etc. Turnbuckles also can be incorporated in systems other than an axial flow turbomachine to couple a first structure and a second structure with an adjustable displacement. In some examples, turnbuckles can be used to adjust the tension of a rope or cable within an assembly. In some examples, a length or orientation of the turnbuckles can be adjusted based on a displacement between the first structure and the second structure.

In known implementations, turnbuckles typically include bearings on opposite ends thereof that couple to a first structure and a second structure. The bearings are typically threadably coupled to an intermediate structure displaced between the bearings. For example, the intermediate structure includes an opening with internal threads, and rods with the bearings include threads on an exterior surface thereof to couple with the internal threads of the intermediate structure as a portion of the rod is inserted through the opening. In some examples, the portion of the rod that is inserted through the opening is adjusted by torqueing (e.g., rotating clockwise, rotating counterclockwise) the rod relative to the intermediate structure to adjust a length of the turnbuckle.

In some examples, the intermediate structure and the bearings of the turnbuckle are fixed in length by a nut that locks (e.g., rotationally locks) the bearings in place relative to the intermediate structure and, thus, prevents rotation of the rods with bearings. In some examples, an orientation of the bearings is determined by the position of the first structure and/or the second structure. Additionally, a rotational orientation of the bearings is associated with the length of the turnbuckle. Specifically, a rotation of the bearing relates to a length of the turnbuckle. In some examples, an adjustment of the length of the turnbuckle to couple to a fixed structure is limited by a thread specification of the turnbuckle. For example, when the bearing of the turnbuckle is aligned to couple with the fixed structure and the length needs to be adjusted, adjustments are limited to a half-turn (e.g., 180 degrees rotation) or a full-turn (e.g., 360 degrees rotation) to maintain the alignment of the bearing with the fixed structure. In some examples, the half-turn or full-turn results in a length of the turnbuckle that does not correspond with a position of the fixed structure to which the bearing is to couple.

In some examples, a predetermined length of the turnbuckle does not correlate with a predetermined orientation of the bearings as determined by the position of the first structure and the second structure. Specifically, when the bearing is rotated to correlate with the first or second structure, the length of the turnbuckle transitions from a first length to a second length that is different from the first length. In some such examples, the first length of the turnbuckle is determined by the displacement between the first structure and the second structure and the second length of the turnbuckle is determined by the orientation of the bearings corresponding with the position of the first structure and the second structure. For example, the first length can result in an orientation of the bearings that does not correspond with the position of the first structure and/or the second structure. Additionally, the second length can deviate from the displacement between the first structure and the second structure as a result of rotating the orientations of the bearings to correspond with the positions of the first and second structures.

Further, a resolution of tension between the first structure and the second structure is limited by the orientations of the bearings. Specifically, the tension between the first structure and the second structure is determined by the length of the turnbuckle, which is limited by the orientation of the bearings that corresponds with the position of the first and second structure. In some examples, the position of the first and/or second structure requires a partial rotation (e.g., a 60 degrees rotation, a 120 degrees rotation, etc.) of the bearing in relation to the orientation of the bearing at the predetermined length of the turnbuckle. In some such examples, a resultant length of the turnbuckle can provide more, or less, tension between the first and second structure than the predetermined length as a result of the partial rotation of the bearing.

In some examples, the length of the turnbuckle is fixed by a pin (e.g., a rod) that is inserted through the intermediate structure and the bearings to maintain a predetermined portion of the bearings within the intermediate structure. In some such examples, the intermediate structure and the bearings include holes (e.g., openings, slots, etc.) for the pin to be inserted within and maintain a relative length and orientation of the turnbuckle. In some such examples, the resolution of the length of the turnbuckle and/or the rotational orientation of the bearing is limited by the position of the holes within the intermediate structure and the bearings. For example, if holes within the intermediate structure and the rods with bearings are positioned in a patterned array with a specific distance and/or relative angle between them, the resolution of the length of the turnbuckle is limited by the distance between the holes and the resolution of the rotational orientation of the bearings is limited by the relative angle between the holes. Specifically, the turnbuckle is unable to provide a length and/or associated orientations of the bearings that does not correspond with a placement of the holes within the intermediate structure and the rods with bearings.

Examples disclosed herein enable a turnbuckle link-gage to adjustably link structures. In some examples, a length of the turnbuckle link-gage and a rotational orientation of associated end bearings are adjusted independently based on a displacement and relative orientation of a first structure and a second structure. In some examples, the turnbuckle link-gage includes an inside rod (e.g., a hollow rod) with tabs (e.g., jaws, clamps, etc.) extending from at least one longitudinal end thereof around an opening of the inside rod. In some examples, the inside rod includes a first opening on a first longitudinal end thereof and a second opening on a second longitudinal end thereof. In some such examples, the first opening and the second opening extend at least partially through the inside rod. Accordingly, the inside rod can be a hollow rod with an internal circumference as the first and second openings extend through the hollow rod. Further, the tabs of the inside rod (e.g., the hollow rod) extend from the first and second longitudinal ends of the inside rod at least partially around the first and second openings.

In some examples, at least a portion of outside rods (e.g., threadless rods) are contained within the first and second openings of the inside rod with the tabs of the inside rod surrounding the outside rods. In other words, the outside rods are positioned at least partially within the openings at the first and second longitudinal ends of the inside rod with the tabs at least partially surrounding the outside rods. In some examples, the inside rod is implemented as a threadless rod (e.g., a smooth rod) including a circumference that is approximately equivalent to the internal circumference of the inside rod (e.g., the hollow rod). In some examples, longitudinal ends of the outside rods (e.g., threadless rods) opposite the portions of the outside rods positioned within the inside rod include rod end bearings to couple the outside rods and, thus, the turnbuckle link-gage, to associated structures.

In some examples, the tabs of the inside rod (e.g., the hollow rod) include conical threads on an exterior surface thereof (e.g., opposite a surface of the tabs that contacts the outside rod). In some examples, conical nuts include internal conical threads complementary to the conical threads of the exterior surface of the tabs to couple to and constrict the tabs around the outside rods. In some such examples, the tabs maintain a position of the outside rods relative to the inside rod and, thus, maintain a length and orientation of the turnbuckle link-gage. In some examples, an exterior surface of the inside rod (e.g., the hollow rod) includes a grip. In some such examples, the exterior surface of the inside rod includes flats to form the grip and enhance torqueing of the conical nuts. As used herein, "flats" include two or more flat surfaces positioned on opposite sides of the exterior surface of the inside rod. In some examples, an intermediate rod is positioned between a first inside rod and a second inside rod. In some such examples, the intermediate rod is at least partially within the first or second opening of the first inside rod and the first or second opening of the second inside rod with the tabs of the first inside rod and the tabs of the second inside rod at least partially surrounding the intermediate rod.

In some examples, the portions of the outside rods positioned within the inside rod are translationally and rotationally adjustable and, thus, the length and/or orientation of the turnbuckle link-gage is adjustable. In some such examples, a translational adjustment of the outside rods with respect to the inside rod is independent from a rotational orientation of the associated end bearings. Further, the turnbuckle link-gage includes a limitless resolution associated with adjustments of the length of the turnbuckle link-gage and the rotational orientation of the end bearings because the adjustments are independent of one another. For example, adjustments of the length of the turnbuckle link-gage result in any length between a minimum and maximum length determined by lengths of the inside rod and outside rods. Accordingly, the turnbuckle link-gage can adjustably link structures by adjusting the length and/or orientation of the turnbuckle link-gage to correspond with the position of the structures. Additionally, the turnbuckle link-gage can adjustably link structures by adjusting the length and/or orientation of the turnbuckle link-gage to adjust the relative position of the structures (e.g., adjust the structures to be closer together or farther apart).

In some examples, the rotational and/or translational adjustment of the turnbuckle link-gage is based on the displacement of a first structure relative to a second structure. In some examples, the first structure is a structure of an axial flow turbomachine (e.g., a torque shaft, a bell handle, a bell crank, etc.) and the second structure is a case (e.g., a rim, a bridge, a ring, etc.) of the axial flow turbomachine that determines a vane angle of variable stator vanes positioned within the case. In some examples, a length of the turnbuckle link-gage and/or a rotational orientation of the associated rod end bearing can be adjusted between iterations of testing of the axial flow turbomachine to determine vane angles of the variable stator vanes that result in efficient operation of an axial flow turbomachine. In some such examples, at least one of the end bearings can be coupled to the first structure and/or the second structure during an adjustment (e.g., translational adjustment, rotational adjustment) of the portion of the threadless rod positioned within the opening of the hollow rod.

Further, the turnbuckle link-gage adjustably links structures via rod (e.g., outside rod, threadless rod, etc.) end bearings that account for a first means for bearing to couple to a first structure and a second means for bearing to couple to a second structure. In some examples, the inside rod (e.g., the hollow rod) accounts for a means for containing that contains at least a portion of the first and second means for bearing. In some such examples, the portions of the first and second means for bearing contained by the means for containing is adjustable. Additionally, the conical nuts and the tabs of the inside rod account for a first and second means for coupling the means for containing to the first and second means for bearing, respectively. Further, the conical nuts and the tabs of the inside rod account for a means for constricting the means for containing around at least a portion of the first and second means for bearing. Accordingly, the portions of the first and second means for bearing contained by the means for containing is determined by a position of a first structure relative to a position of a second structure. Although the turnbuckle link-gage is described herein as a part of the axial flow turbomachine, the turnbuckle link-gage can be implemented within any other system that includes components to be coupled with a displacement between them.

FIG. 1 illustrates an example axial flow turbomachine 100 with turnbuckle link-gages 102 coupled to structures of the axial flow turbomachine 100. In the illustrated example of FIG. 1, the axial flow turbomachine 100 includes the turnbuckle link-gages 102, a case (e.g., bridges, rings, etc.) 104, and a torque shaft 106. The illustrated example includes a magnified view 101 of a portion of the case 104. As shown in FIG. 1, the turnbuckle link-gages 102 adjustably link (e.g., couple, connect, etc.) the case 104 and the torque shaft 106 of the axial flow turbomachine 100. In some examples, a positioning of the case 104 determines vane angles of variable stator vanes to direct airflow through rotor blades of the axial flow turbomachine 100. In the illustrated example of FIG. 1, the torque shaft 106 and associated turnbuckle link-gages 102 control the orientation of the case 104 and, thus, the vane angles of the variable stator vanes. In other examples (not shown), the turnbuckle link-gages 102 can be coupled to an alternative structural part of the axial flow turbomachine 100 instead of the torque shaft 106, such as a pump handle, bell crank, etc., to control the vane angles.

In the illustrated example of FIG. 1, the turnbuckle link-gages 102 include adjustable lengths and rotational orientations of associated end bearings that couple to the case 104 and the torque shaft 106 to adjustably link the case 104 and the torque shaft 106. Further, the position of the case 104 and/or the torque shaft 106 can be adjusted and linked by the turnbuckle link gages 102 to maintain that adjustment. In some examples, during iterations of testing of the axial flow turbomachine 100, the length of the turnbuckle link-gages 102 and the rotational orientation of the associated end bearings are iteratively adjusted to determine optimal or otherwise advantageous vane angles that more efficiently provide compressed air through the rotor blades to a downstream combustor of the axial flow turbomachine 100. In some examples, when the optimal vane angles of the variable stator vanes are determined, the length of the turnbuckle link-gages 102 and the rotational orientations of the associated end bearings are fixed to maintain the determined vane angles during operation of the axial flow turbomachine 100.

Figure 2:
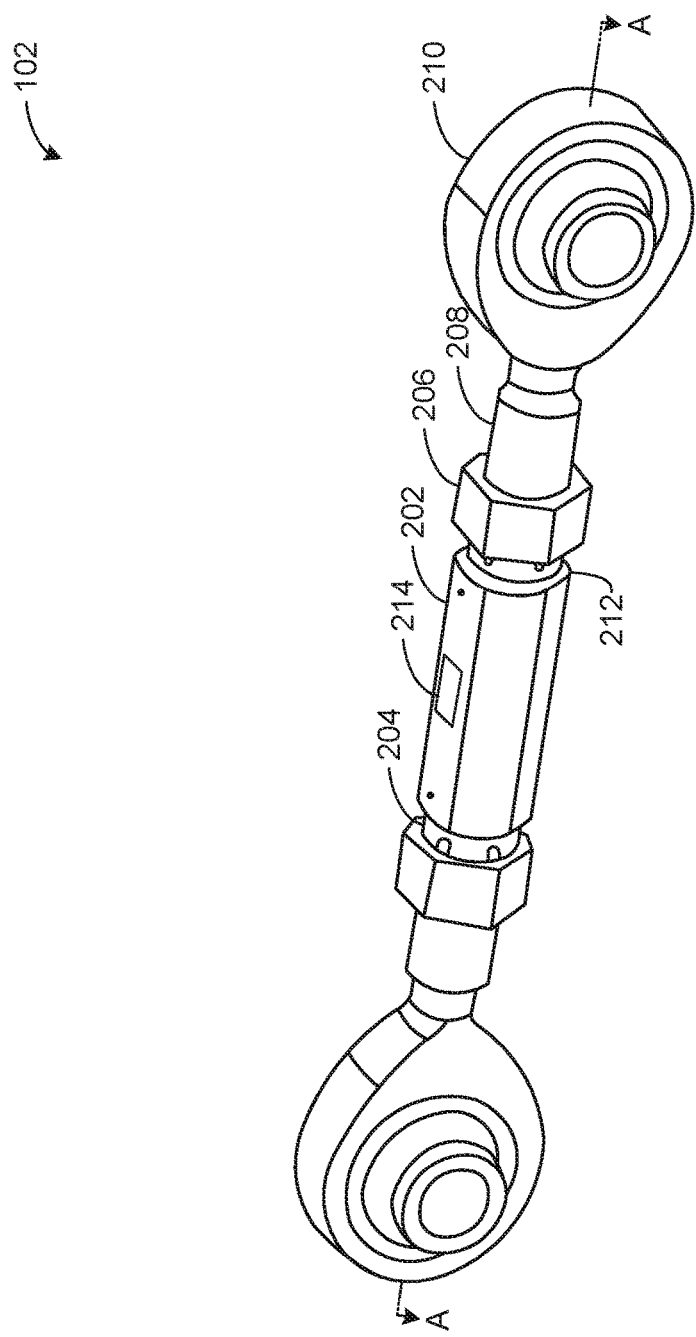
FIG. 2 illustrates an example turnbuckle link-gage of the axial flow turbomachine of FIG. 1.

FIG. 2 illustrates the turnbuckle link-gage 102 of the axial flow turbomachine 100 shown in FIG. 1. In the illustrated example of FIG. 2, the turnbuckle link-gage 102 includes an inside rod (e.g., a hollow rod) 202 including openings on longitudinal ends 212 extending at least partially through the inside rod 202 and tabs (e.g. jaws, clamps, etc.) 204 extending from the longitudinal ends 212 concentrically, or at least partially, around the openings. The turnbuckle link-gage 102 further includes conical nuts 206, and outside rods (e.g., threadless rods) 208 including end bearings 210. In some examples, an exterior surface of the tabs 204 includes conical threads.

In the illustrated example of FIG. 2, the outside rods 208 are positioned at least partially within the openings of the inside rod 202. The tabs 204 of the inside rod 202 at least partially surround the outside rods 208. In the illustrated example of FIG. 2, the conical nuts 206 include threads that correlate with the conical threads of the tabs 204. The conical nuts 206 couple to the conical threads of the tabs 204 to constrict the tabs 204 around the outside rod 208, thereby coupling the inside rod 202 and the outside rods 208 and fixing the length and orientation of the turnbuckle link-gage 102. As shown in FIG. 2, an exterior surface of the inside rod 202 includes flats 214 to form a grip and enhance torqueing of the conical nuts 206. In other words, the inside rod 202 is a prism with openings on the longitudinal ends 212 thereof.

In the illustrated example of FIG. 2, portions of the outside rods 208 positioned within the inside rod 202 are adjustable and, thus, the length of the turnbuckle link-gage 102 is adjustable. In some such examples, at least one of the conical nuts 206 is loosened so the tabs 204 do not constrict around the associated outside rod 208 which allows the outside rod 208 to slide further into, or out of, the opening of the inside rod 202. In some examples, at least one of the end bearings 210 is coupled to at least one of the case 104 of the variable stator vanes or a structure of the axial flow turbomachine 100 during an adjustment of the portion of the outside rod 208 positioned within the inside rod 202.

Further, an adjustment of a rotational orientation of the end bearings 210 is independent from the adjustment of the portions of the outside rods 208 positioned within the inside rod 202. In some examples, the adjustment of the rotational orientation of the end bearings 210 and/or the adjustment of the portions of the outside rods 208 positioned within the inside rod 202 is determined by a position of a first structure relative to a second structure. For example, the adjustments can be determined by the position of the case 104 relative to the torque shaft 106.

Figure 3:
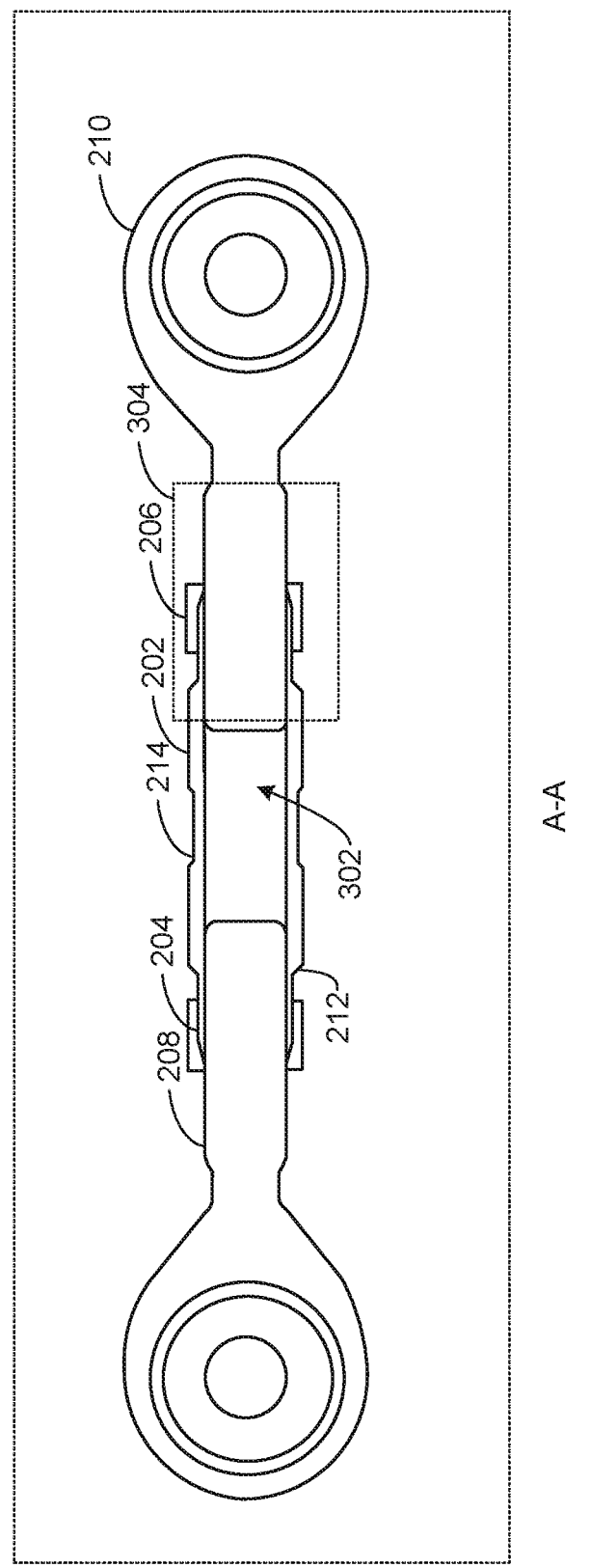
FIG. 3 illustrates an example cross section of the turnbuckle link-gage of FIGS. 1 and/or 2.

FIG. 3 illustrates an example cross section along reference line A-A of the turnbuckle link-gage 102 indicated in FIG. 2. The example cross section A-A of the turnbuckle link-gage 102 includes an opening 302 within the inside rod (e.g., the hollow rod) 202 and a contact area 304 between the conical nuts 206, the tabs 204 of the inside rod 202, and the outside rods (e.g., the threadless rods) 208. In the illustrated example of FIG. 3, the opening 302 extends through the inside rod 202. Further, although the example of FIG. 3 shows the opening 302 extending through the inside rod 202, the inside rod 202 can include separate ones of the opening 302 at the longitudinal ends 212 extending partially through the inside rod 202. In the illustrated example of FIG. 3, the portions of the outside rods 208 positioned within the opening 302 of the inside rod 202 are at least partially within the longitudinal end 212 of the inside rod 202 to provide a secure contact area 304 for the tabs 204.

Figure 4:
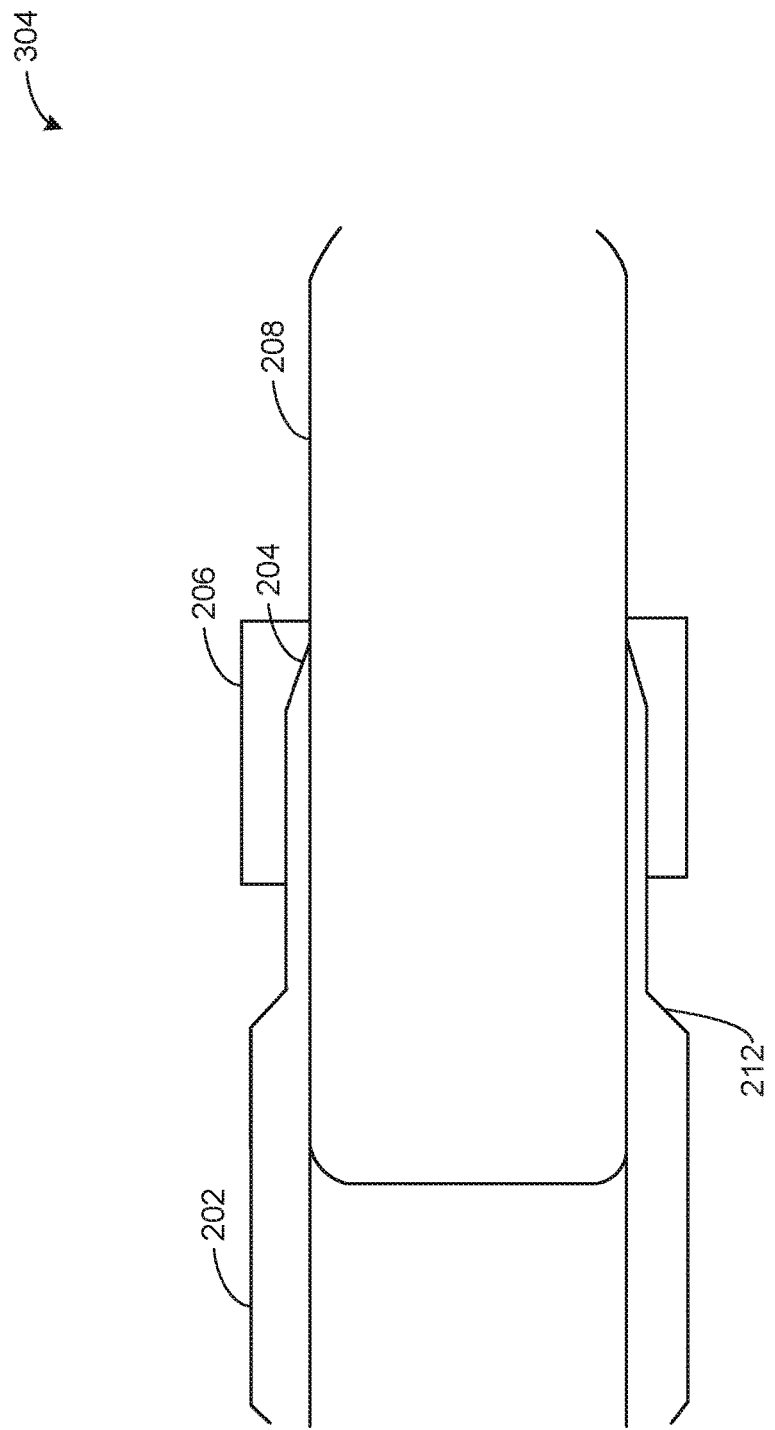
FIG. 4 illustrates a magnified view of the example cross section of the turnbuckle link-gage of FIG. 3.

FIG. 4 illustrates a magnified view of the contact area 304 between the conical nuts 206, the tabs 204 of the inside rod 202, and the outside rod 208. In the illustrated example of FIG. 4, a circumference of the outside rod 208 is approximately equivalent to an internal circumference of the inside rod 202. As shown in FIG. 4, the conical nut 206 threadably couples with the tabs 204 of the inside rod 202 to constrict (e.g., tighten, compress, etc.) the tabs 204 around the outside rod 208 and, thus, couple the inside rod 202 and the outside rod 208. In other words, a conical portion of the conical nut 206, discussed further in association with FIG. 6, constricts the tabs 204 around the outside rod 208 as the conical nut 206 is torqued and shifts toward the longitudinal end 212 of the inside rod 202. Further, as the conical portion of the conical nut 206 travels up a conical portion of the tabs 204, discussed further in association with FIG. 5, towards the longitudinal end 212 of the inside rod 202, the conical portion of the conical nut 206 compresses the tabs 204 between the conical nut 206 and the outside rod 208 to fix (e.g., lock, constrict, etc.) the position of the outside rod 208 relative to the inside rod 202.

Figure 5:
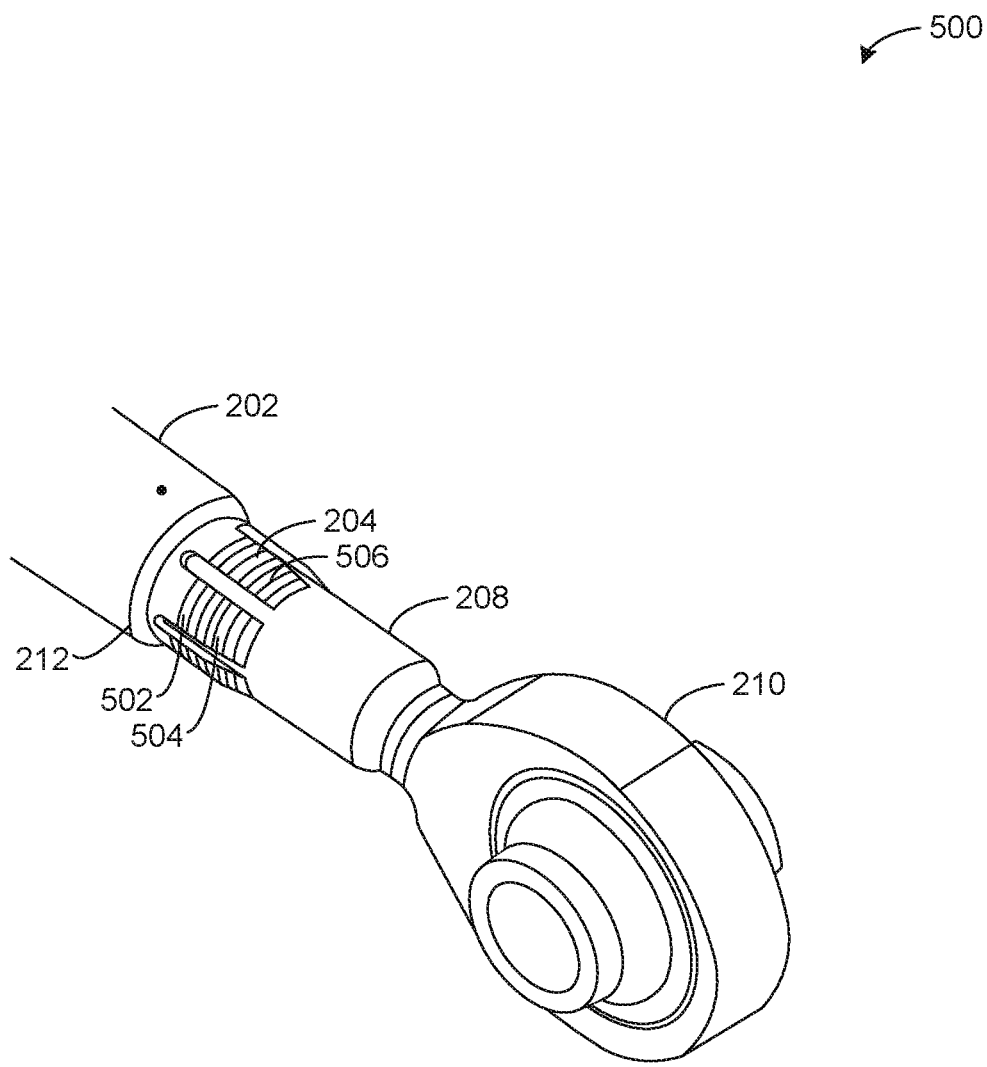
FIG. 5 illustrates an example portion of the turnbuckle link-gage illustrated in FIGS. 1, 2, 3, and/or 4.

FIG. 5 illustrates an example portion of the turnbuckle link-gage 500 of FIGS. 1, 2, 3, and/or 4. In the illustrated example of FIG. 5, the portion of the turnbuckle link-gage 500 includes a first portion of the tabs 502 with a uniform thickness, a second portion of the tabs 504 with a conical thickness, and threads 506 of the tabs across the first portion of the tabs 502 and the second portion of the tabs 504. The illustrated portion of the turnbuckle link-gage 500 further includes the inside rod 202 and the associated longitudinal end 212 thereof, the outside rod 208, and the end bearing 210. In the illustrated example of FIG. 5, the conical nut 206 is removed from the portion of the turnbuckle link-gage 500 to provide a view of the tabs 204 that extend from the longitudinal end 212 around the opening of the inside rod 202 and at least partially surround the outside rod 208.

In the illustrated example of FIG. 5, the outside rod 208 can slide further into, or out of, the inside rod 202 to adjust the length of the turnbuckle link-gage 102. Further, the outside rod 208 can be rotated to adjust the orientation of the end bearing 210 to correlate with the position of the structure that the end bearing 210 is to couple to. In some examples, the conical nut 206 is at least partially coupled to the threads of the tabs 506, or placed around the outside rod 208, as the length of the turnbuckle link-gage 102 or the orientation of the end bearing 210 is adjusted. For example, the conical nut 206 can be partially coupled to the first portion of the tabs 502 and not the second portion of the tabs 504 while adjustments are made so the tabs 204 do not constrict around the outside rod 208 allowing the outside rod 208 to rotate and/or translate further into or out of the opening of the inside rod 202. In some such examples, the conical nut 206 is tightened around the tabs 204 to secure the length of the turnbuckle link-gage and the orientation of the end bearings 210 after the adjustments have been made to correspond to positions of a first and second structure.

In some examples, the tabs 204 are constricted around the outside rod 208 when the conical nut 206 couples to the threads 506 of the second portion of the tabs 504. For example, the conical portion of the conical nut 206, as discussed further in association with FIG. 6, constricts the tabs 204 around the outside rod 208 as the conical nut 206 couples to the threads 506 of the second portion of the tabs 504 and is torqued towards the longitudinal end 212 of the inside rod 202. Further, as the conical nut 206 is torqued and the conical portion of the conical nut 206 engages with the second portion of the tabs 504 and moves towards the longitudinal end 212, the tabs 204 encounter a compression force that is translated to the outside rod 208 positioned between the tabs 204 to maintain the position thereof.

Figure 6:
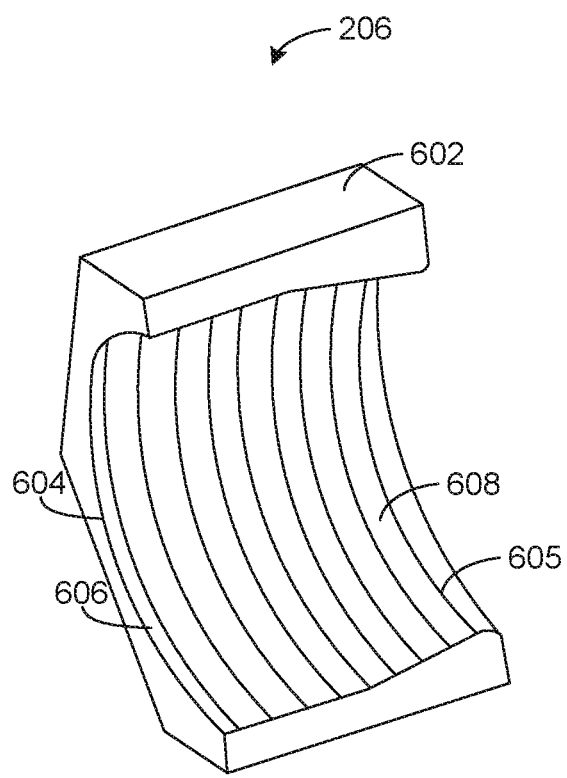
FIG. 6 illustrates an example nut of the turnbuckle link-gage of FIGS. 1, 2, 3, and/or 4.

FIG. 6 illustrates the conical nut 206 of the turnbuckle link-gage 102 of FIGS. 1, 2, 3, and/or 4. In the illustrated example of FIG. 6, the conical nut 206 includes an exterior surface 602 and an interior surface 604 including threads 605, a first portion of the interior surface 606 with a uniform circumference, and a second portion of the interior surface 608 with a conical circumference. In other words, the circumference of the interior surface 604 is reduced as the second portion of the interior surface 608 extends away from the first portion of the interior surface 606. In the illustrated example of FIG. 6, tooling, such as a wrench, is positioned on the exterior surface 602 to provide torque to tighten or loosen the conical nut 206 around the tabs 204.

In some examples, the first portion of the interior surface 606 of the conical nut 206 threadably couples to the first portion of the tabs 502 while the second portion of the interior surface 608 threadably couples to the second portion of the tabs 504. In some examples, the second portion of the interior surface 608 includes a slightly smaller conical circumference in comparison to the second portion of the tabs 504. In some such examples, the engagement between the threads 605 of the second portion of the interior surface 608 and the threads 506 of the second portion of the tabs 504 substantially constricts the tabs 204 of the inside rod 202 to couple the inside rod 202 and the outside rod 208 and fix (e.g., lock) the position of the outside rod 208 relative to the inside rod 202. In some examples, to adjust the portion of the outside rod 208 positioned within the inside rod 202, or the orientation of the rod end bearing 210, the conical nut 206 is loosened to at least partially uncouple the second portion of the interior surface 608 from the second portion of the tabs 504 and, thus, reduce the compression force of the tabs 204 on the outside rod 208. Further, after appropriate adjustments are made, the conical nut 206 is tightened (e.g., torqued) to couple the second portion of the interior surface 608 to the second portion of the tabs 504.

Figure 7:
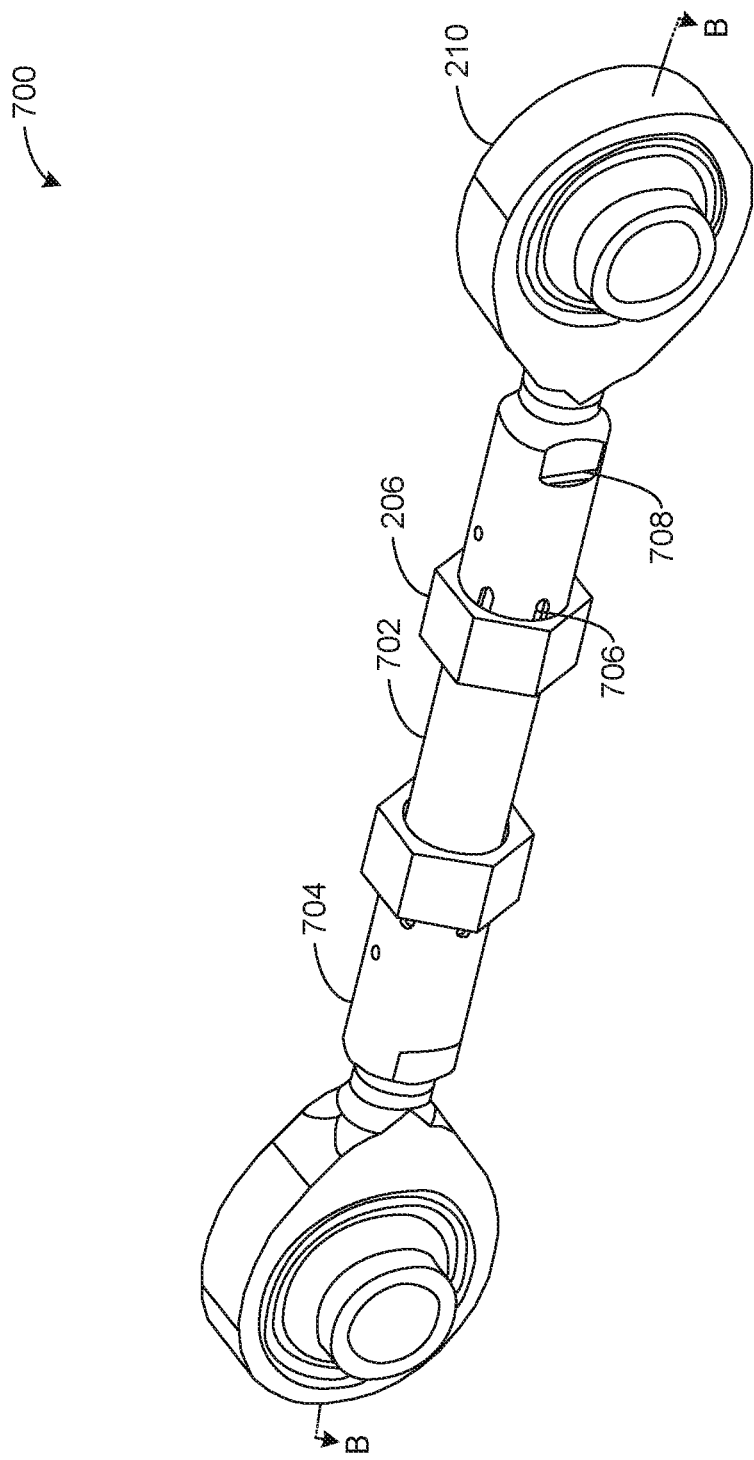
FIG. 7 illustrates a second example turnbuckle link-gage of the axial flow turbomachine of FIG. 1.

FIG. 7 illustrates a second example turnbuckle link-gage 700 that can be used in the axial flow turbomachine 100 of FIG. 1. In FIG. 7, the turnbuckle link-gage 700 includes a threadless rod 702, hollow rods 704, and the conical nuts 206. In FIG. 7, the hollow rods 704 includes tabs 706, flats 708, and the end bearing 210. In FIG. 7, a longitudinal end of the hollow rods 704 includes an opening opposite the end bearing 210, as discussed further in association with FIG. 8. In FIG. 7, the threadless rod 702 is positioned at least partially within the openings of the hollow rods 704. In FIG. 7, the tabs 706 extend from the longitudinal end of the hollow rods 704 concentrically, or at least partially, around the openings of the hollow rods 704. In FIG. 7, the tabs 706 include conical threads on an exterior surface thereof. In FIG. 7, the tabs 706 at least partially surround the threadless rod 702. In FIG. 7, the conical nuts 206 couple to and constrict the tabs 706 around the threadless rod 702 to couple the threadless rod 702 and the hollow rods 704. In some examples, the flats 708 provide a grip to enhance torqueing of the conical nuts 206 around the tabs 706. In some examples, the end bearings 210 of the hollow rods 704 couple to structures of the axial flow turbomachine 100, such as the case 104 and/or the torque shaft 106.

In the illustrated example of FIG. 7, portions of the threadless rod 702 positioned within the hollow rods 704 are adjustable. The length of the turnbuckle link-gage 700 is adjustable based on an adjustment of the position of the portions of the threadless rod 702 within the hollow rods 704. In some examples, at least one conical nut 206 is loosened so the tabs 706 expand and do not constrict around the threadless rod 702, which allows the threadless rod 702 to slide further into, or out of, the openings of the hollow rods 704. In FIG. 7, the hollow rod 704 is rotated while the tabs 706 are not constricted around the threadless rod 702 to adjust an orientation of the associated end bearing 210. In some examples, a rotational orientation of the end bearings 210 is independent from the length of the turnbuckle link-gage 700 and/or an adjustment thereof. In some examples, the rotational orientation of the end bearings 210 and the length of the turnbuckle link-gage 700 are independently adjusted to couple to the structures of the axial flow turbomachine 100.

Figure 8:
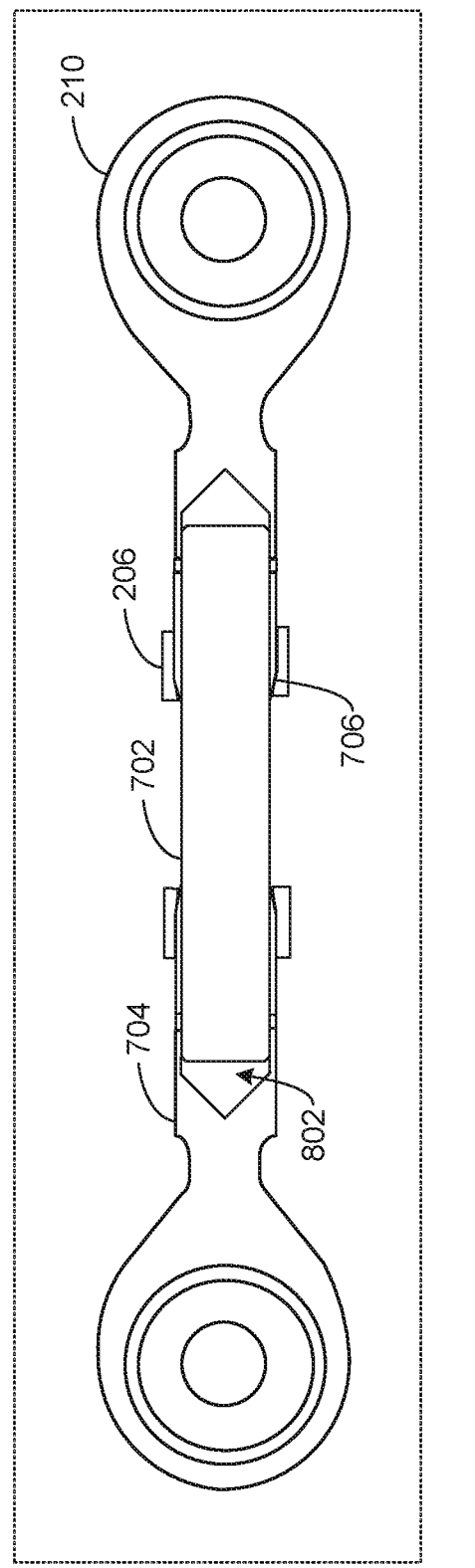
FIG. 8 illustrates an example cross section of the turnbuckle link-gage of FIG. 7.

FIG. 8 illustrates an example cross section along a reference line B-B of the turnbuckle link-gage 700 of FIG. 7. The example cross section B-B of the turnbuckle link-gage 700 includes openings 802 within the hollow rods 704. In the illustrated example, the openings 802 extend partially through the hollow rods 704. In FIG. 8, the threadless rod 702 is positioned at least partially within the openings 802. In some examples, portions of the threadless rod 702 positioned within the hollow rod 704 are adjustable. In some examples, the tabs 706 are constricted around the threadless rod 702 by the conical nuts 206 to maintain the portions of the threadless rod 702 within the hollow rod 704.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that adjustably link structures via a turnbuckle link-gage. More specifically, the examples described herein enable a turnbuckle link-gage with a length and rotational orientation of associated end bearings that are independently adjustable. Further, the turnbuckle link-gage includes a limitless resolution associated with adjustments of the length of the turnbuckle link-gage and the rotational orientation of the end bearings. As a result, the turnbuckle link-gage provides a link between structures that is adjustable to correspond with positions of the structures.

Examples of a turnbuckle link-gage are disclosed herein. Further examples and combinations thereof include the following:

1. An apparatus comprising an inside rod including a first opening on a first longitudinal end of the inside rod and a second opening on a second longitudinal end of the inside rod, the first opening and the second opening extending at least partially through the inside rod, the inside rod including tabs extending from the first longitudinal end and the second longitudinal end of the inside rod at least partially around the first opening and the second opening, an exterior surface of the tabs including conical threads, outside rods to be at least partially positioned within the openings of the inside rod, the tabs of the inside rod at least partially surrounding the outside rods, the outside rods including end bearings to couple to a first structure and a second structure, and conical nuts including threads correlating with the conical threads of the tabs of the inside rod, the conical nuts to threadably couple to the tabs, the conical nuts to constrict the tabs around the outside rods and couple the inside rod and the outside rods.

2. The apparatus of any preceding clause, wherein portions of the outside rods to be positioned within the inside rod are adjustable.

3. The apparatus of any preceding clause, wherein an adjustment of a rotational orientation of the end bearings is independent from an adjustment of the portions of the outside rods to be positioned within the inside rod.

4. The apparatus of any preceding clause, wherein the adjustment of the rotational orientation of the end bearings and the adjustment of the portions of the outside rods to be positioned within the inside rod is determined by a position of the first structure relative to the second structure.

5. The apparatus of any preceding clause, wherein an exterior surface of the inside rod includes flats to form a grip and enhance torqueing of the conical nuts.

6. The apparatus of any preceding clause, wherein the inside rod is a first inside rod, and further including an intermediate rod positioned between the first inside rod and a second inside rod, the intermediate rod to be at least partially within the first opening or the second opening of the first inside rod and the first opening or the second opening of the second inside rod, the tabs of the first inside rod and the tabs of the second inside rod at least partially surrounding the intermediate rod.

7. An apparatus comprising a hollow rod with an internal circumference, the hollow rod including tabs extending from at least one longitudinal end of the hollow rod, an exterior surface of the tabs including conical threads, at least one threadless rod, at least a portion of the threadless rod to be positioned within the hollow rod, a circumference of the threadless rod to be approximately equivalent to the internal circumference of the hollow rod, and at least one nut including internal conical threads complementary to the conical threads of the exterior surface of the tabs of the hollow rod, an engagement between the internal conical threads of the nut and the conical threads of the exterior surface of the tabs of the hollow rod to substantially constrict the tabs of the hollow rod around the threadless rod to couple the hollow rod and the threadless rod.

8. The apparatus of any preceding clause, wherein the portion of the threadless rod to be positioned within the hollow rod is adjustable.

9. The apparatus of any preceding clause, wherein a longitudinal end of at least one of the threadless rod or the hollow rod includes an end bearing.

10. The apparatus of any preceding clause, wherein a translational adjustment of the threadless rod with respect to the hollow rod is independent from a rotational orientation of the end bearing.

11. The apparatus of any preceding clause, wherein the translational adjustment of the threadless rod and the rotational orientation of the end bearing are determined by a position of a first structure that a first end bearing couples to relative to a second structure that a second end bearing couples to.

12. The apparatus of any preceding clause, wherein the tabs extend from the at least one longitudinal end of the hollow rod around the internal circumference.

13. The apparatus of any preceding clause, wherein an exterior surface of the hollow rod includes a grip, the grip including flats positioned on the exterior surface of the hollow rod to enhance torqueing of the nut.

14. An axial flow turbomachine comprising variable stator vanes to direct airflow through rotor blades of the axial flow turbomachine, and turnbuckle link-gages to couple a case of the variable stator vanes to a structure of the axial flow turbomachine, the turnbuckle link-gages including a hollow rod with an opening, the hollow rod including tabs extending from at least one longitudinal end around the opening, an exterior surface of the tabs including conical threads, a threadless rod, the threadless rod to be positioned at least partially within the opening of the hollow rod, and nuts including conical threads, the nuts to couple the hollow rod and the threadless rod by coupling to the tabs of the hollow rod and constricting the tabs of the hollow rod around the threadless rod.

15. The axial flow turbomachine of any preceding clause, wherein a portion of the threadless rod positioned within the opening of the hollow rod is adjustable.

16. The axial flow turbomachine of any preceding clause, wherein at least one of the threadless rod or the hollow rod includes an end bearing to couple to the case of the variable stator vanes.

17. The axial flow turbomachine of any preceding clause, wherein the end bearing is coupled to the case of the variable stator vane or the structure of the axial flow turbomachine during an adjustment of the portion of the threadless rod positioned within the opening of the hollow rod.

18. The axial flow turbomachine of any preceding clause, wherein a rotational orientation of the end bearing is adjustable.

19. The axial flow turbomachine of any preceding clause, wherein an adjustment of the rotational orientation of the end bearing is independent of an adjustment of the portion of the threadless rod positioned within the opening of the hollow rod.

20. The axial flow turbomachine of any preceding clause, wherein an adjustment of the portion of the threadless rod positioned within the opening of the hollow rod or an adjustment of the rotational orientation of the end bearing is determined by a position of the case of the variable stator vanes and the structure of the axial flow turbomachine.

21. The axial flow turbomachine of example 14, further including flat surfaces positioned on an exterior surface of the hollow rod to enhance torqueing of the nuts.

22. An apparatus comprising first means for bearing to couple to a first structure, second means for bearing to couple to a second structure, means for containing at least a portion of the first means for bearing and at least a portion of the second means for bearing, wherein the portion of the first means for bearing and the portion of the second means for bearing contained by the means for containing is adjustable, first means for coupling the means for containing to the first means for bearing, and second means for coupling the means for containing to the second means for bearing.

23. The apparatus of any preceding clause, wherein the portion of the first means for bearing and the portion of the second means for bearing contained by the means for containing determined by a position of the first structure relative to a position of the second structure.

24. The apparatus of any preceding clause, wherein the first means for coupling and the second means for coupling includes a means for constricting the means for containing around at least a portion of the first means for bearing and the second means for bearing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
an inside rod including a first opening on a first longitudinal end of the inside rod and a second opening on a second longitudinal end of the inside rod, the first opening and the second opening extending at least partially through the inside rod, the inside rod including tabs extending from the first longitudinal end and the second longitudinal end of the inside rod at least partially around the first opening and the second opening, the tabs including a first portion having a uniform thickness and a second portion having a conical thickness, an exterior surface of the tabs including conical threads;
outside rods to be at least partially positioned within the openings of the inside rod, the tabs of the inside rod at least partially surrounding the outside rods, the outside rods including end bearings to couple to a first structure and a second structure; and
conical nuts including threads correlating with the conical threads of the tabs of the inside rod, the conical nuts to threadably couple to the tabs, the conical nuts to constrict the tabs around the outside rods and couple the inside rod and the outside rods.

2. The apparatus of claim 1, wherein portions of the outside rods to be positioned within the inside rod are adjustable.

3. The apparatus of claim 2, wherein an adjustment of a rotational orientation of the end bearings is independent from an adjustment of the portions of the outside rods to be positioned within the inside rod.

4. The apparatus of claim 3, wherein the adjustment of the rotational orientation of the end bearings and the adjustment of the portions of the outside rods to be positioned within the inside rod is determined by a position of the first structure relative to the second structure.

5. The apparatus of claim 1, wherein an exterior surface of the inside rod includes flats to form a grip and enhance torqueing of the conical nuts.

6. The apparatus of claim 1, wherein the first structure is a torque shaft in an axial flow turbomachine and the second structure is a case of the axial flow turbomachine.

7. An apparatus comprising:
a hollow rod with an internal circumference, the hollow rod including tabs extending from at least one longitudinal end of the hollow rod, the tabs including a first portion having a uniform thickness and a second portion having a conical thickness, an exterior surface of the tabs including conical threads;
at least one threadless rod, at least a portion of the at least one threadless rod to be positioned within the hollow rod, a circumference of the at least one threadless rod to be approximately equivalent to the internal circumference of the hollow rod, a longitudinal end of at least one of the hollow rod or the at least one threadless rod including an end bearing; and
at least one nut including internal conical threads complementary to the conical threads of the exterior surface of the tabs of the hollow rod, an engagement between the internal conical threads of the at least one nut and the conical threads of the exterior surface of the tabs of the hollow rod to substantially constrict the tabs of the hollow rod around the at least one threadless rod to couple the hollow rod and the at least one threadless rod.

8. The apparatus of claim 7, wherein the portion of the at least one threadless rod to be positioned within the hollow rod is adjustable.

9. The apparatus of claim 7, wherein a translational adjustment of the at least one threadless rod with respect to the hollow rod is independent from a rotational orientation of the end bearing.

10. The apparatus of claim 9, wherein the end bearing is a first end bearing and the structure in the axial flow turbomachine is a first structure, wherein the translational adjustment of the at least one threadless rod and the rotational orientation of the end bearing are determined by a position of the first structure to which the first end bearing couples relative to a second structure in the axial flow turbomachine to which a second end bearing couples.

11. The apparatus of claim 7, wherein the tabs extend from the at least one longitudinal end of the hollow rod around the internal circumference.

12. An axial flow turbomachine comprising:
variable stator vanes to direct airflow through rotor blades of the axial flow turbomachine; and
turnbuckle linkages to couple a case of the variable stator vanes to a structure of the axial flow turbomachine, the turnbuckle linkages including:
a hollow rod with an opening, the hollow rod including tabs extending from at least one longitudinal end around the opening, an exterior surface of the tabs including conical threads;

a threadless rod, the threadless rod to be positioned at least partially within the opening of the hollow rod; and nuts including conical threads, the nuts to couple the hollow rod and the threadless rod by coupling to the tabs of the hollow rod and constricting the tabs of the hollow rod around the threadless rod.

13. The axial flow turbomachine of claim 12, wherein a portion of the threadless rod positioned within the opening of the hollow rod is adjustable.

14. The axial flow turbomachine of claim 13, wherein at least one of the threadless rod or the hollow rod includes an end bearing to couple to the case of the variable stator vanes.

15. The axial flow turbomachine of claim 14, wherein the end bearing is coupled to the case of the variable stator vanes or the structure of the axial flow turbomachine during an adjustment of the portion of the threadless rod positioned within the opening of the hollow rod.

16. The axial flow turbomachine of claim 14, wherein a rotational orientation of the end bearing is adjustable.

17. The axial flow turbomachine of claim 16, wherein an adjustment of the rotational orientation of the end bearing is independent of an adjustment of the portion of the threadless rod positioned within the opening of the hollow rod.

18. The axial flow turbomachine of claim 16, wherein an adjustment of the portion of the threadless rod positioned within the opening of the hollow rod or an adjustment of the rotational orientation of the end bearing is determined by a position of the case of the variable stator vanes and the structure of the axial flow turbomachine.

19. The axial flow turbomachine of claim 12, further including flat surfaces positioned on an exterior surface of the hollow rod to enhance torqueing of the nuts.

* * * * *